(12) United States Patent
Ogawa et al.

(10) Patent No.: US 6,226,819 B1
(45) Date of Patent: May 8, 2001

(54) MULTI-LAYERED SEAT HAVING DIFFERENT HARDNESSES AND PROVIDED WITH SKIN, AND PROCESS OF MANUFACTURING THE SAME

(75) Inventors: Taro Ogawa; Yasumasa Senoo; Takeshi Watadani; Yasuyuki Toda, all of Kurashiki (JP)

(73) Assignee: Namba Press Works., Ltd., Kurashiki (JP)

( * ) Notice: Subject to any disclaimer, the term of this patent is extended or adjusted under 35 U.S.C. 154(b) by 0 days.

(21) Appl. No.: 09/029,914
(22) PCT Filed: Dec. 3, 1996
(86) PCT No.: PCT/JP96/03535
   § 371 Date: Mar. 10, 1998
   § 102(e) Date: Mar. 10, 1998
(87) PCT Pub. No.: WO98/02289
   PCT Pub. Date: Jan. 22, 1998

(30) Foreign Application Priority Data

Jul. 12, 1996 (JP) .................................................. 8-200947

(51) Int. Cl.[7] ........................................................ B68G 5/00
(52) U.S. Cl. ........................ 5/653; 264/46.6; 297/452.27; 297/452.61; 29/91.1
(58) Field of Search .................................... 264/101, 102, 264/319, 321, 45.1, 46.4, 46.6; 425/812; 5/653, 655.9; 297/452.27, 452.37, 452.61; 29/91, 91.1

(56) References Cited

U.S. PATENT DOCUMENTS

| | | | |
|---|---|---|---|
| 4,738,810 | * | 4/1988 | DeFilippo ........................ 264/46.6 X |
| 4,837,881 | * | 6/1989 | Kondo et al. ............................. 5/653 |
| 4,927,575 | * | 5/1990 | Brock et al. ........................ 264/46.6 |
| 4,976,414 | | 12/1990 | Yanagishita . |
| 5,232,643 | * | 8/1993 | Purser ................................. 264/46.6 |
| 5,587,183 | * | 12/1996 | Clark et al. ....................... 425/812 X |
| 5,850,645 | * | 12/1998 | Ogawa et al. ........................... 5/653 |

* cited by examiner

*Primary Examiner*—Terry Lee Melius
*Assistant Examiner*—James M. Hewitt
(74) *Attorney, Agent, or Firm*—Renner, Kenner, Greive, Bobak, Taylor and Weber

(57) ABSTRACT

A seat having various hardnesses provided with a surface material. The seat is air-permeable, has a tactile feeling of the seat surface and has a hardness capable of supporting the weight of a person who sits thereon. The seat (1) is covered with an air-permeable surface material (2) and has a foamed body having a shape generally corresponding to an external shape of the seat. The foamed body includes a first foamed body (10) as a base of the foamed body and a second foamed body (6) connected integrally with the first foamed body. The first foamed body (10) has ascending parts (12, 13) which are formed on parts of a surface thereof. In the method for manufacturing the seat, the mixture (15) is introduced and layered on the first foamed body (10) and the surface material (2) is placed thereon. The mixture is compressed between the first foamed body (10) and a pressure applying die having a shape corresponding to a shape of an upper part of the seat when it has completed a gas reaction thereof and is still in a visco-elastic flowing condition. The pressure applying die has suction holes, and the mixture (15) is simultaneously sucked through the suction holes. Thereby, the second foamed body (6) is connected in one with the surface material and the first foamed body.

18 Claims, 8 Drawing Sheets

(a)

(b)

(a)

(b)

(a)

(b)

MULTI-LAYERED SEAT HAVING DIFFERENT HARDNESSES AND PROVIDED WITH SKIN, AND PROCESS OF MANUFACTURING THE SAME

TECHNICAL FIELD

The present invention relates to a seat used for an industrial vehicle such as a fork lift truck and a tractor, a seat used in an office or as furniture and a chair used as furniture and, in particular, relates to a seat comprising a foamed body having various hardnesses and a surface material connected in one with the foamed body and a method for manufacturing such a seat.

BACKGROUND OF ART

A method of the art for manufacturing a seat comprising a foamed body having various hardnesses and an air-permeable surface material connected in one with the foamed body is shown in FIGS. 5 and (this method is described in a Japanese patent application filed on Jul. 1, 1996,). This manufacturing method is carried out as follows.

A first foamed body 51 as a base part has been molded in advance. As shown in FIG. 5, firstly, a liquid foamable mixture 52 such as a polyurethane foam is introduced and layered on the first foamed body 51. A thickness of the liquid foamable mixture 52 layered on the first foamed body 51 is generally leveled over a flat part 51' of the first foamed body 51. An air-permeable surface material 54 is composed of an upper part 55 and side parts 56, 56' stitched on both sides of the upper part 55. The upper part 55 of the surface material 54 is placed on the mixture 52 layered on the first foamed body 51, and the side parts 56, 56' are positioned on both side surfaces of the first foamed body 51.

A part of the mixture 52 which contacts with the flat part 51' of the first foamed body 51 is impregnated into the first foamed body 51 through the flat part 51' thereof, so that an impregnated layer is formed.

Then, a pressure applying die 60 is positioned above the surface material ( see FIG.6 ). This pressure applying die 60 is hollowed, and a plurality of suction holes 61, 62 are provided adjacent to ascending parts formed on a surface 60' of the die 60. Descending parts formed on the seat are molded by those ascending parts of the die 60. The pressure applying die 60 is moved downward and an inner space thereof is simultaneously pumped out through the suction holes 61, 62. Both the liquid foamable mixture 52 and the surface material 54 are pressed and compressed between the pressure applying die 60 and the first foamed body 51 when the mixture 52 has completed a gas reaction thereof but is still in a visco-elastic flowing condition.

As described above, the low air-permeable impregnated layer is formed in the foamed body 51 which contacts with the mixture 52 layered thereon, so that the whole becomes a low air-permeable composite material, and when the inner space of the pressure applying die 60 is pumped out during the pressing and compression, the pumping force acts on the low air-permeable composite material, so that a large pressure difference is produced between an inside of the composite material and a pumping side thereof. Thus, even though a molding surface of the pressure applying die has a complicated shape, the liquid foamable mixture in the visco-elastic flowing condition is attracted toward the pumping side with the surface material while a reactive force caused by the pressing and compression acts thereto, so that the surface material 54 is pushed onto the pressure applying die so as to follow the molding surface 60' of the pressure applying die 60. A portion which can be molded and shaped in a desired shape corresponding to a shape of a die by sucking the liquid foamable mixture with the surface material as described above is hereinafter referred to as a sucked and molded portion.

Then, the liquid foamable mixture 52 is changed (or cured) into a solid condition ( a resin like condition ), so that the second foamed body 51 having a desired resiliency can be formed, and simultaneously, a back surface of the surface material 54 is connected in one with an upper side of the second foamed body 51 and the first foamed body is connected in one with a lower side thereof.

If a hardness of the first foamed body and that of the second foamed body are adjusted, respectively, or if the compressibility and the like of the second foamed body is adjusted when carrying out the pressing and compression, then a seat having various hardnesses provided in the surface material can be manufactured.

As described above, according to this method of the art, a seat with an air-permeable surface material can be manufactured without use of a lower die, such that the first foamed body is connected in one with the second foamed body and even though a molding surface of a pressure applying die has a complicated shape, the surface material can be connected with the second foamed body and can have a shape corresponding to the molding surface of the pressure applying die.

However, since the liquid foamable mixture in a visco-elastic flowing condition is introduced and layered thereon in level, the mixture is uniformly resinified (cured), so that the layered mixture can be easily compressed uniformly, and, as described above, since the impregnated layer is formed, the whole of the mixture 52 and the first foamed body 51 results in a low air-permeable composite material, so that the whole of the first foamed body 51 is pushed toward the pressure applying die 60 by the pressure difference produced by the suction. That is, as indicated by a broken line shown in FIG. 6, the first foamed body 51 is lifted upward and moved toward the mixture 52 so as to crush the whole of the mixture 52 and so as to thin the thickness thereof, and then, when the mixture is cured, it may make the tactile feeling of a seat surface worse.

If the sucking force is reduced to avoid such a lift, a molding of the mixture by the suction can not be carried out sufficiently.

Also, when manufacturing a seat having a complicated shape and deeper descending parts, that is, when manufacturing such a seat by use of a pressure applying die having a complicated molding surface shape, it is required to suck strongly to carry out sufficient molding by the suction. However, the first foamed body 51 is lifted more strongly upward and moved toward the mixture 52, and as a result, the mixture 52 is crushed more.

Moreover, if the mixture is cured when the first foamed body is lifted upward, the first foamed body is recovered to its original shape by a resiliency of the first foamed body after completing the molding, and as a result, a part of the second foamed body desired to be flat is deeply depressed, and thus, a seat having a desired shape can not be manufactured.

As described above, when molding a seat shape, the mixture 52 should not be compressed by the lift of the first foamed body. (The mixture at such a portion is hereinafter referred to as a portion not to be compressed.)

The present invention is made in order to solve those problems, and an object thereof is to provide a seat and a method for manufacturing the seat wherein the seat has a surface shape corresponding to a molding surface of a molding die, a surface material of the seat is connected in one with a foamed body thereof and a tactile feeling of a surface of the seat is improved.

Another object of the present invention is to provide the seat and a method for manufacturing the seat wherein an air-permeable surface material can we used for the seat described above.

Still another object of the present invention is to provide the seat and a method for manufacturing the seat wherein an upper layer of the seat which contacts a person is soft and a lower layer thereof which supports a weight of the person is hard.

Yet still another object of the present invention is to provide the seat and a method for manufacturing the seat wherein the hardness of the upper layer is partially different.

DISCLOSURE OF INVENTION

A seat according to the present invention, which achieves those objects, comprises an air-permeable surface material and a foamed body covered with the surface material. The foamed body has a shape generally corresponding to the external shape of the seat and comprises a first foamed body as a base and a second foamed body connected in one with the surface material through a back surface of the surface material and connected in one with the first foamed body through a surface of the first foamed body. The second foamed body connected in one with the surface material through the back surface thereof and connected in one with the first foamed body through a surface thereof by introducing and layering a liquid foamable mixture on the first foamable mixture, positioning the surface material on the liquid foamable mixture introduced and layered on the first foamed body, positioning a pressure applying die, which has a molding surface and suction holes, above the surface material, and pressing and compressing the liquid foamable mixture between the first foamed body and the pressure applying die and simultaneously sucking the liquid foamable mixture through the suction holes of the pressure applying die when the liquid foamable mixture has completed a gas reaction thereof but is still in a visco-elastic flowing condition.

Note that, before the introduced and layered liquid foamable mixture on the first foamed body is pressed and compressed, a thickness of a portion of the liquid foamable mixture corresponding to a sucked and molded portion is smaller than that of a portion substantially not to be compressed. The liquid foamable mixture may be introduced and layered at the portion corresponding to the sucked and molded portion more thinly than the portion substantially not be compressed. Alternatively, the portion of the liquid foamable mixture corresponding to the sucked and molded portion may be thinner by introducing and layering the liquid foamable mixture on a surface of the first foamed body having an ascending part corresponding to the level sucked and molded portion along a flat surface of the surface of the first foamed body.

The present invention provides a method for manufacturing a seat comprising a foamed body having a shape generally corresponding to an external shape of the seat and an air-permeable surface material connected in one with the foamed body. The foamed body comprises a first foamed body as a base and a second foamed body connected in one with the first foamed body. The method of the present invention comprises the steps of introducing and layering a liquid foamable mixture for forming the second foamed body on a surface of the first foamed body, placing the surface material on the first foamed body, positioning a pressure applying die having a molding surface and suction holes above the surface material, and pressing and compressing the layered liquid foamable mixture between the first foamed body and the pressure applying die and sucking the liquid foamable mixture through the suction holes of the pressure applying die when the layered liquid foamable mixture has completed a gas reaction thereof but is still in a visco-elastic flowing condition.

Note that a thickness of a portion of the liquid foamable mixture corresponding to a sucked and molded portion in the step of introducing and layering the liquid foamable mixture on the surface of the first foamed body is smaller than that of a portion not substantially compressed. The liquid foamable mixture may be introduced and layered at the portion corresponding to the sucked and molded portion more thinly than the portion not substantially compressed. Alternatively, the portion of the liquid foamable mixture corresponding to the sucked and molded portion may be thinner by introducing and layering the liquid foamable mixture on a surface of the first foamed body having an ascending part corresponding to the sucked and molded portion in level along a flat surface of the surface of the first foamed body.

The sucking holes of the pressure applying die used in the present invention are at least provided at positions corresponding to a sucked and molded portion of the second foamed body.

Note that this sucked and molded portion is defined as a portion at which a desired shape following a molding surface of the pressure applying die is molded by sucking the liquid foamable mixture with the surface material.

While the suction into an inner space of the pressure applying die may be carried out through a part of each suction hole, an air-ventilation between the inner space and an outside of the pressure applying die may be carried out through another part of each suction hole. Alternatively, a plurality of holes are provided therein, and while part of a plurality of suction holes may be provided at positions corresponding to sucked and molded portions of the second foamed body to carry out the suction, the air-ventilation between the inner space and the outside of the pressure applying die may be carried out through the other suction holes.

Introducing and layering the liquid foamable mixture can be carried out before or after the surface material is placed.

In order to partially change the thickness of the second foamed body, it is desirable to partially change the compressibility against the liquid foamable mixture when applying a pressure to the liquid foamable mixture which has completed a gas reaction thereof but is still in a visco-elastic flowing condition. It is desirable that the partial change in the compressibility is carried out by partially changing a space between the pressure applying die and the first foamed body, introducing and layering the liquid foamable mixture on the first foamed body in the same thickness, and pressing and compressing the layered mixture.

It is desirable to differ the hardness of the first foamed body from that of the second foamed body. It is desirable that the first foamed body and the second foamed body are made of a material selected from reactive foamable resins such as a polyurethane foam and a polyurea foam.

As the surface material, a fiber sheet of an air permeable woven or knitted fabric can be used. A plate material of a slab urethane foam can be attached on a back surface of the surface material.

In the liquid foamable mixture for forming the second foamed body, the curing time (a resinification time) thereof depends on the thickness of the layered liquid foamable mixture such that the curing (resinification) is slower at a thin part of the layered mixture and, in contrast, the curing is faster at a thick part thereof.

In the formation of the second foamed body, when the liquid foamable mixture is introduced and layered thinly on a part of the first foamed body corresponding to the sucked and molded portion, the mixture is cured slowly at this part, and when the mixture is introduced and layered thickly on the other parts of the first foamed body, the mixture is cured quickly at those parts. This mixture is pressed between the first foamed body and the molding surface of the pressure applying die and is simultaneously sucked through the suction holes of the pressure applying die which are provided at positions corresponding to the sucked and molded portions. With this, the curing at the thick part of the layered mixture is progressed, so that the lift of the first foamed body caused by the suction can be restricted, and the sucked and molded portion or the thin part of the layered mixture is still in a visco-elastic flowing condition, so that this thin part can be attracted with the surface material toward the sucking side. By changing this mixture into a solid condition, the surface material is connected in one with the first foamed body, and as a result, a seat having a shape corresponding to the molding surface of the pressure applying die can be manufactured.

In the seat of the present invention manufactured as described above, the surface material is connected in one with the foamed body, and thus, when a weight of a person who sits on the seat is released, the surface material is recovered into its original shape by the resiliency of the foamed body. In addition, the surface material is air-permeable, and the foamed body is not crushed when the foamed body is pressed and compressed, and thus, the seat has an excellent resiliency and gives a good tactile feeling.

Moreover, by partially changing the space between the pressure applying die and the first foamed body and by pressing and compressing therebetween, the hardness of the second foamed body is partially changed. When a hard upper side part is formed in the seat, a central part of the seat is maintained soft and the holding-ability of the seat is improved.

The hardness of the first foamed body is selectable and can be determined independently from that of the second foamed body, and thus, a hardness of the first foamed body can be provided so as to support the weight of a person who sits thereon.

BEST MODE FOR CARRYING OUT THE INVENTION

Figure 1:
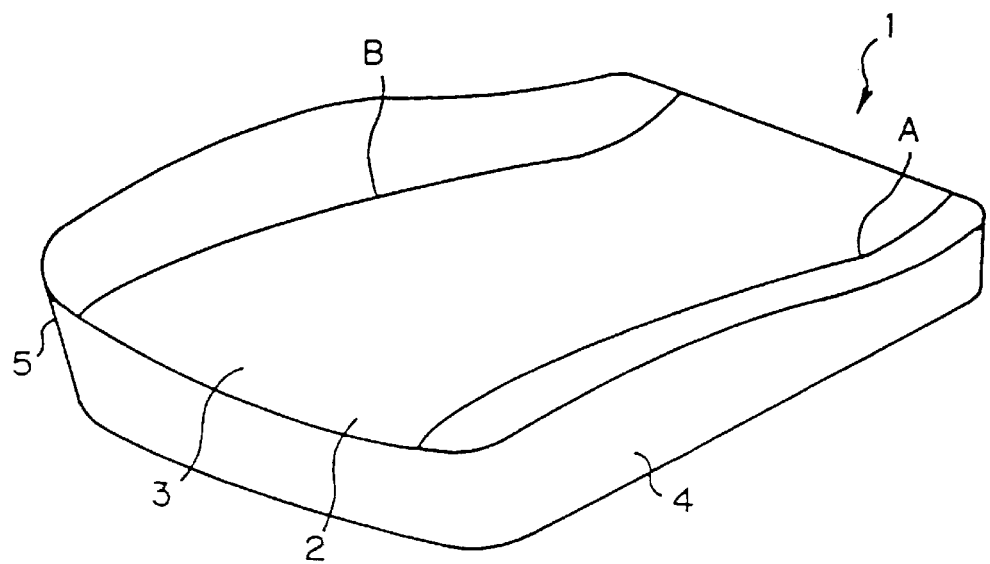
FIG. 1(a) is a perspective view of a seat according to the present invention.
FIG. 1(b) is a cross sectional view of the seat according to the present invention.
Figure 1:
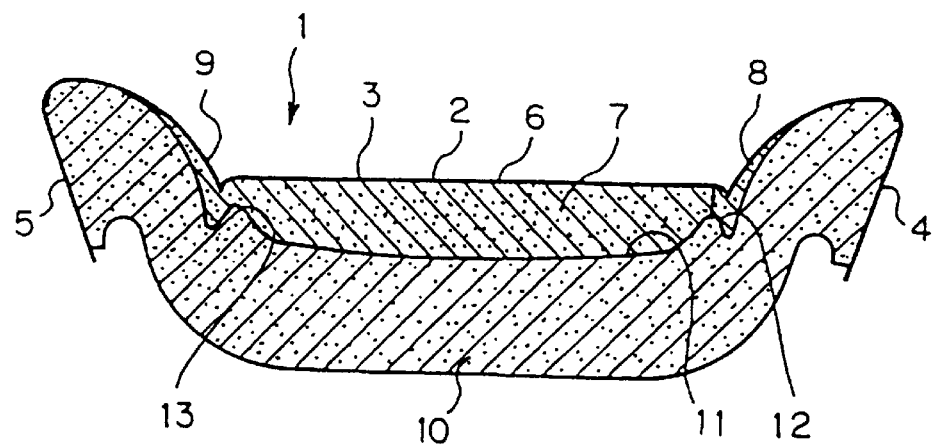

FIG. 1(a) is a perspective view of a seat manufactured by a method according to the present invention, and FIG. 1(b) is a cross sectional view of this seat. The seat 1 comprises a surface material 2, a first foamed body 10 which is underlying as a base, and a second foamed body 6 positioned thereon, and an external shape of the seat 1 is given by the whole.

The surface material 2 comprises an upper part 3 and side parts 4, 5 continued from both sides thereof. The upper part 3 (which forms an upper part of the seat) covers the second foamed body 6, and a back surface thereof connected in one with the second foamed body 6. The side parts 4, 5 cover the second foamed body 6. A lower surface of the second foamed body 6 is connected in one with the first foamed body 10.

In the seat shown in FIG. 1, the upper part 3 and the side parts 4, 5 are separately cut from a sheet material and are stitched in one with each other, however, the whole of those parts can be cut from a single sheet material.

A material of the surface material 2 used herein is not specified but is an air-permeable material, as used generally for a surface material of a seat, selected from several fiber sheet materials including a woven or knitted fabric and the like.

The first foamed body 10 which is underlying has a shape generally corresponding to the shape of the seat. In the first foamed body 10, ascending parts 12, 13 are provided below descending parts A, B of the seat shown in FIG. 1(a), respectively. This first foamed body 10 is connected in one with the second foamed body 6 such that the second foamed body 6 is underlain by the first foamed body 10, in accordance with a manufacturing method described below.

The first foamed body 10 is made of a reactive resin of a polyurethane foam and, in alternative, is made of a reactive resin of a polyurea foam. Also, the first foamed body 10 can be made of a material selected from higher reactive compositions than a polyurethane foam and a polyurea foam, and those are hereinafter referred to as a reactive resin of a polyurethane foam, a polyurea foam or the like.

The second foamed body 6 has a main part 7 having a generally uniform thickness. However, as described above, since the first foamed body 10 has the ascending parts 12, 13 on a surface 11 thereof, thicknesses of the second foamed body 6 adjacent to those ascending parts 12, 13 are thin. In addition, the second foamed body 6 has slope portions 8, 9 on both sides of the main part 7, and the thickness of each slope portion is gradually smaller.

This second foamed body 6 is made of a reactive resin such as a polyurethane foam, a polyurea foam or the like. A composition thereof is shown in detail in Table 1 hereinbelow.

The hardness of the second foamed body 6 may be uniform through the whole of this second foamed body 6, however, it is desirable to make the slope portions 8, 9 harder than the main part 7 in order to improve the holding-ability for a person who sits thereon and in order to hold the external shape of the seat, in accordance with a method for manufacturing the second foamed body, described below.

With regard to the hardness of each foamed body, it is desirable to make the second foamed body 6 soft and to make the first foamed body 10 harder than the second foamed body 6. It is achieved by making the second foamed body 6 soft to make comfortable to sit on, and it is achieved by making the first foamed body 10 harder to support a weight of a person, to improve the holding-ability and to hold an external shape of the seat. In addition, if the foamability is required, only the first foamed body may be made softer.

As shown in FIG. 1, in the seat 1 according to the present invention, the relatively deep descending parts A, B are formed therein. Advantageously, according to the method of the present invention, a tactile feeling of the seat surface is not injured and a seat having complicated shapes other than those descending parts can be manufactured.

A method for manufacturing a seat in accordance with the present invention is described below.

Figure 2:
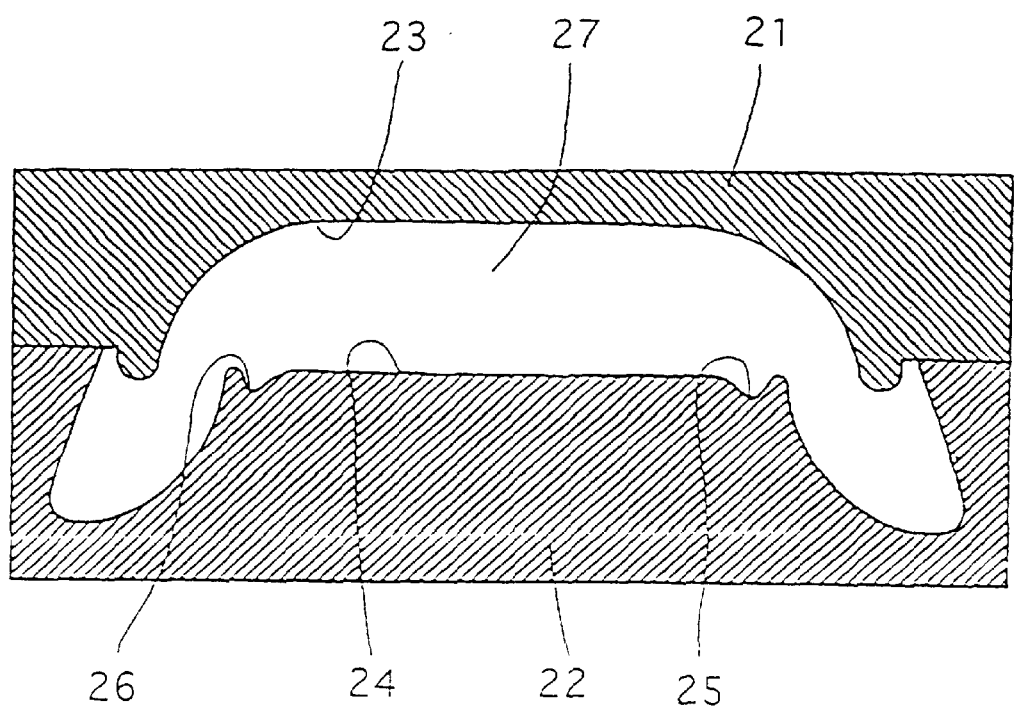
FIG. 2(a) a cross sectional view of a molding die used for molding a first foamed body having ascending parts.
FIG. 2(b) is a cross sectional view of the first foamed body molded by use of the foaming die of FIG. 2(a).
Figure 2:
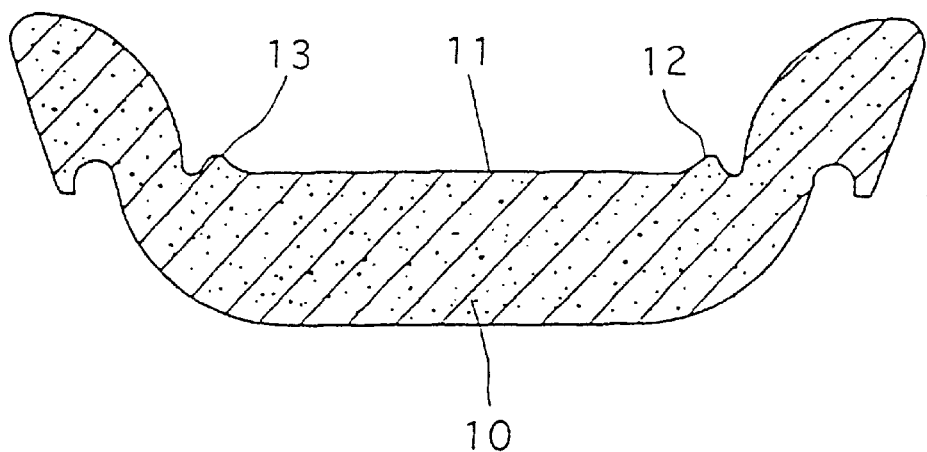

In order to mold the first foamed body 10 as a base of the seat, a foaming die shown in FIG. 2(a) for molding the first foamed body 10 is provided. The foaming die comprises an upper portion 21 and a lower portion 22. An inner surface of the upper portion 21 has a shape corresponding to a shape of a bottom part of the first foamed body 10, and an inner surface of the lower portion 22 has descending parts 25, 26 on both sides of the inner surface 24. When the upper and lower portions 21, 22 are closed, a shape of a space formed between those portions are corresponding to a three dimensional shape of the first foamed body 10.

The first foamed body 10 is molded by introducing a liquid foamable mixture on the lower portion 22, closing the upper portion 21, and foaming the liquid foamable mixture therebetween. This first foamed body 10 serves as a lower portion of a die for molding the second foamed body 6, as described below.

As shown in FIG. 2(b), ascending parts 12, 13 are formed on both sides of an upper surface 11 of the first foamed body by the descending parts 25, 26 provided on the inner surface 24 of the foaming die 22.

Figure 3:
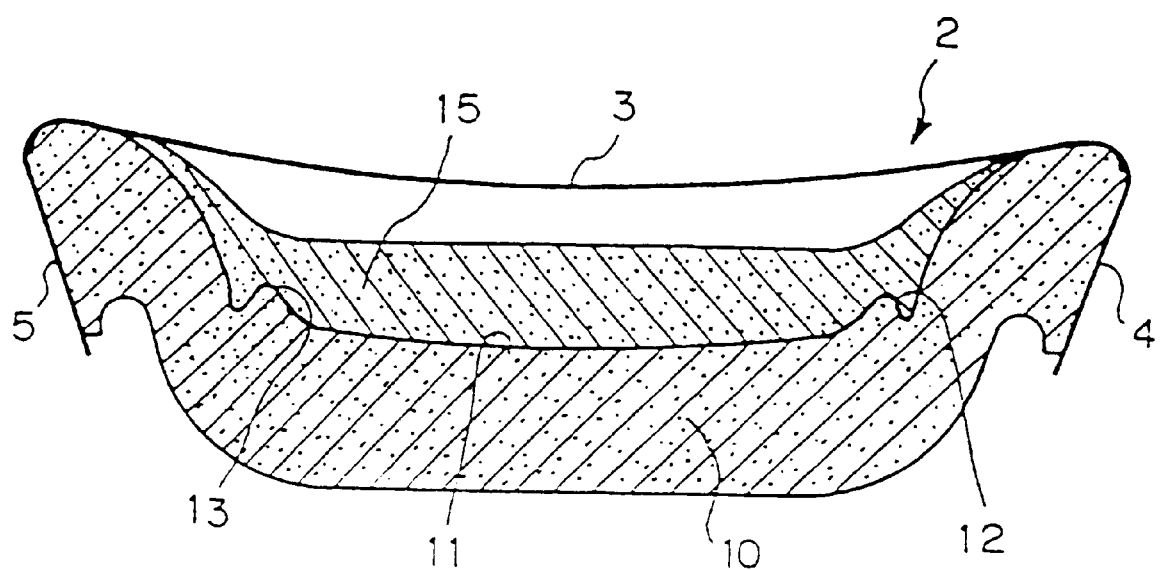
FIG. 3 is a cross sectional view of an arrangement when a surface material is positioned above a liquid foamable mixture which is introduced and layered on a first foamed body so as to be thin on ascending parts and so as to be thick over a central part thereof.

Then, as shown in FIG. 3, a liquid foamable mixture 15 is introduced and layered over the whole area of the first foamed body 10 by, for example, use of a spray system. One example of the liquid foamable mixture 15 is shown in Table 1.

TABLE 1

| (weight by parts) | |
|---|---|
| polypropyleneglycol | 100.0 |
| water | 3.2 |
| organic tin catalyst | 0.3 |
| tertiary amine catalyst | 0.8 |
| polymethylenepolyphenilpolyisocyanate | 68.0 |

Note that the mixture 15 is layered on the upper surface 11 of the first foamed body 10 such that a surface of the mixture 15 is generally horizontal. That is, the ascending parts 12, 13 are provided on the upper surface 11 of the first foamed body 10, and thereby the mixture 15 is introduced and layered thinly about those ascending parts 12, 13 and is introduced and layered in level over a central part thereof (a part not to be compressed).

A part of the introduced and layered mixture 15 contacts the surface of the first foamed body 10 and is impregnated into the first foamed body 10 through the surface 11 thereof, so that an impregnated layer is formed.

Then, a surface material 2 comprising an upper part 3 and side parts 4, 5 stitched on both sides thereof is placed so as to position the upper part 3 above the layered mixture 15 and so as to position the side parts 4, 5 on both sides of the first foamed body 10.

Figure 4:
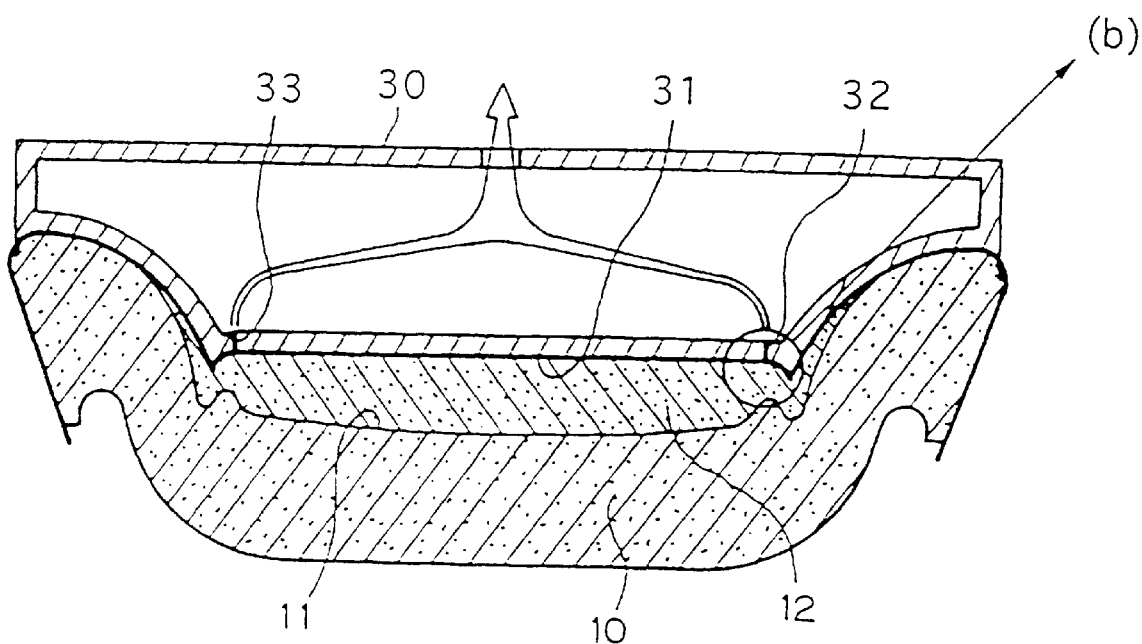
FIG. 4(a) is a cross sectional view of an arrangement when a liquid foamable mixture which is introduced and layered on a first foamed body is pressed with a surface material positioned thereon between a pressure applying die and the first foamed body and is simultaneously sucked through suction holes of the pressure applying die, in accordance with the present invention.
FIG. 4(b) is an enlarged cross sectional view of a sucked and molded portion.
Figure 4:
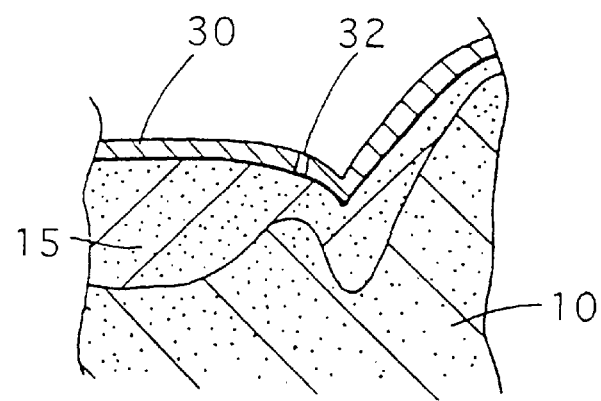
Figure 5:
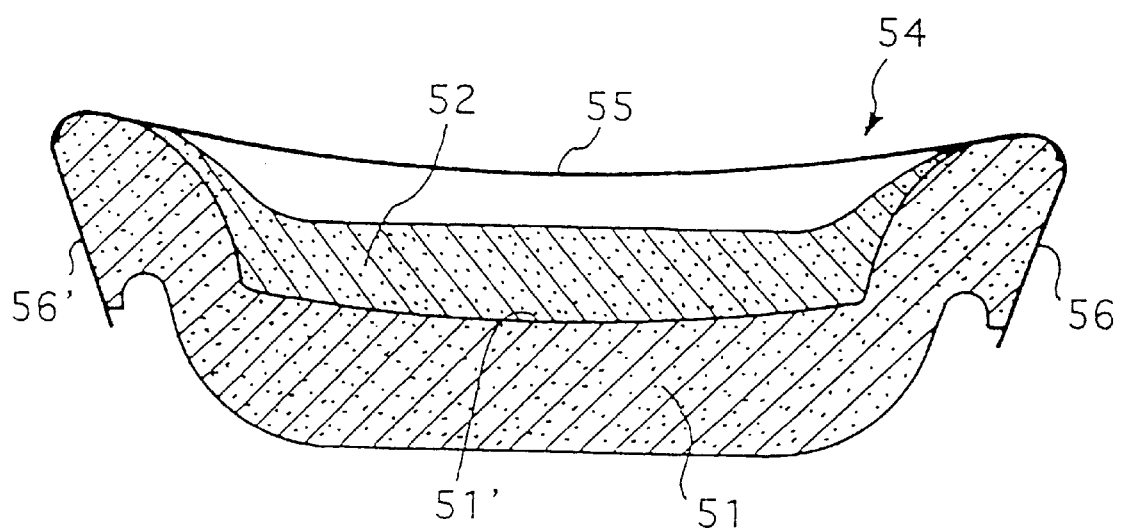
FIG. 5 is a cross sectional view of an arrangement when a surface material is positioned above a liquid foamable mixture which is for forming a second foamed body and which is introduced and layered on a first foamed body, in accordance with a method of the art.
Figure 6:
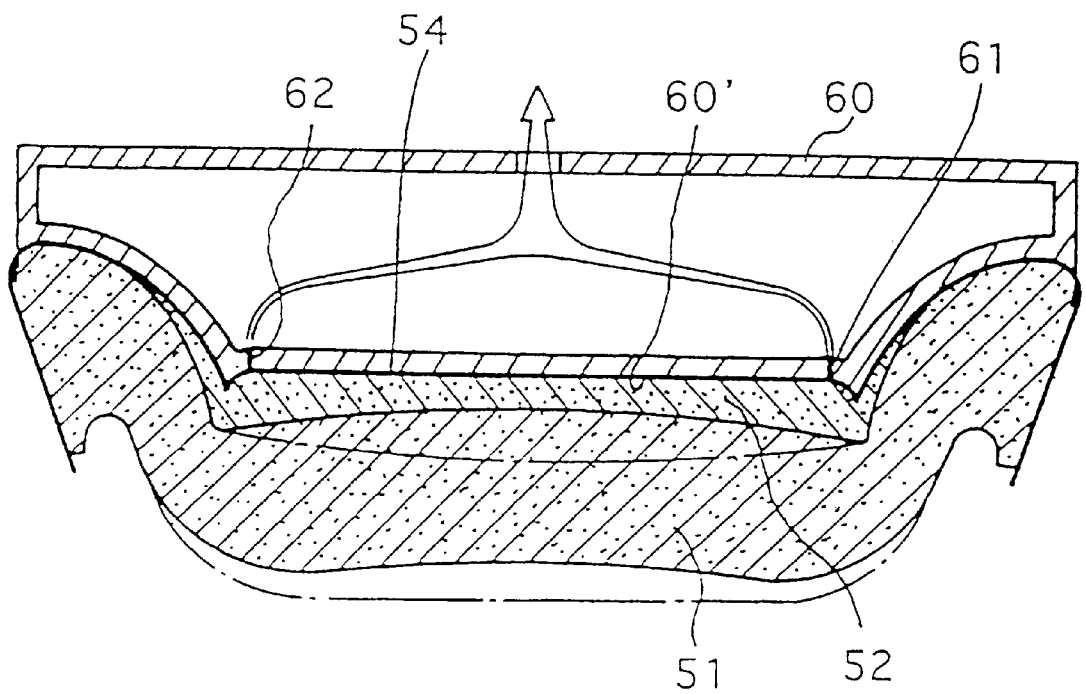
FIG. 6 is a cross sectional view of an arrangement when a liquid foamable mixture which is introduced and layered on a first foamed body is pressed and compressed with a surface material positioned thereon between the first foamed body and a pressure applying die, in accordance with a method of the art.

Then, a pressure applying die 30 is positioned above the surface material (FIG. 4). An external shape of this pressure applying die is similar to an external shape of a conventional pressure applying die (with reference to FIG. 6), and a three dimensional shape of the second foamed body 6 is molded between a molding surface 31 thereof and the upper surface 11 of the first foamed body 10. The upper part 3 of the surface material 2 conforms to the molding surface 31 of the pressure applying die 30.

Moreover, the pressure applying die 30 is hollow, and a plurality of suction holes 32, 33 are provided therein along ascending parts about the descending parts A, B of the seat 1 shown in FIG. 1.

The pressure applying die 30 shown in the figure is hollowed so as to form the inner space in the whole space inside the die 30, but if it is possible to suck through the suction holes, it is not necessary to form the inner space in the whole space inside the die 30. For example, a decompression chamber maybe provided only on the suction hole to suck by decompressing the decompression chamber. Alternatively, without providing such a decompression chamber, the suction hole may be connected to an external vacuum source.

It is desirable to provide a plurality of holes as the suction hole, but a slit may be provided along the descending part. In this embodiment, the suction holes are provided in line on left- and right-hand sides and, in the alternative, may be provided in a plurality of lines dependent on an ascending shape, the compression time, the size of the seat and the like. Also, a size of each suction hole can be determined according to the compression molding condition.

The pressure applying die 30 is connected to an external vacuum source so as to pump out the inner space thereof.

In the embodiment described above, the pressure applying die 30 is disposed after placing the surface material 2 on the layered mixture 15, but this order is not essential in the present invention and can be reversed.

Then, as shown in FIG. 4, the inner space of the pressure applying die 30 is pumped out and simultaneously the pressure applying die is moved downward to press and compress the layered liquid foamable mixture 15 together with the surface material 2 when the mixture 15 has completed a gas reaction thereof but is still in a visco-elastic flowing condition.

When a reaction of the liquid foamable mixture used herein is accelerated and the foaming and molding is completed, the liquid foamable mixture results in a stable, excellent resilient foamed body. This foamed body is not easily deformed if it is pressed and compressed.

However, the liquid foamable mixture is in a very unstable condition during the reaction stage thereof. That is, the mixture has a fluidity for a certain duration after completing the gas reaction and can be easily deformed by applying an external force. Thus, when the mixture is sucked, the mixture can be attracted in this suction direction. Also, when the mixture is pressed together with another foamed body or a fiber sheet, the mixture enters into this foamed body or a part of a fiber structure of this fiber sheet, so that this foamed body or this fiber sheet can be connected in one with the foamed body of the mixture. In addition, when the compressibility against the mixture is partially changed, a part of the resulting foamed body with a high compressibility is hard and a part of the resulting foamed body with a low compressibility is soft.

Figure 7:
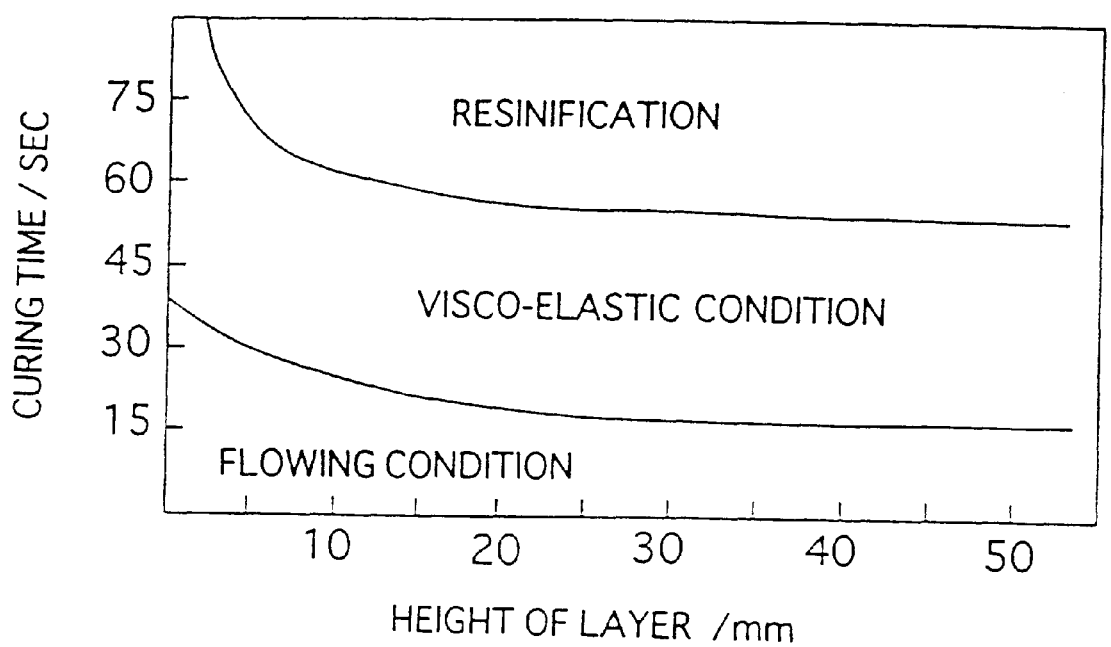
FIG. 7 is a graph showing a relationship between the thickness of a layered liquid foamable mixture, which is for forming a foamed body of a seat, and a curing time thereof.

Moreover, a curing time (a resinification time) of the liquid foamable mixture (Table 1) depends on a height of the layered mixture, as shown in FIG. 7. That is, a portion at which the height of the layered mixture is low is slowly cured (or resinified), and a portion at which the height thereof is high is quickly cured.

The composition of the foamable mixture shown in Table 1 shows a characteristic (behavior) shown in FIG. 7 in detail, but this characteristic can be varied dependent upon the composition and prescription of the foamable mixture.

As described above, the curing speed depends on the height of the layered mixture. This is because a reaction of such a foamable mixture is an exothermic reaction. That is, it can be supposed that a heat of reaction is regenerated in a thick portion of the layered mixture, so that the reaction is accelerated and the mixture is quickly cured, and in a thin portion thereof, a heat of regeneration is less and the heat is easily radiated, so that the mixture is slowly cured.

As described above, the ascending parts 12, 13 are provided on the surface 11 of the first foamed body 10 and the mixture 15 is introduced and layered on the surface 11 thereof generally in level, so that a thickness of the mixture 15 is small about those ascending parts 12, 13 and is large over the central part thereof. Thus, the mixture is cured slowly about those ascending parts and is cured quickly over the central part thereof.

In addition, a low air-permeable impregnated layer is formed between the layered mixture 15 and the foamed body 10 as described above, so that the whole becomes a low air-permeable composite material, and thus, when the inner space of the pressure applying die 30 is pumped out during the pressing and compression, this suction force acts on the low air-permeable composite material, so that a large pressure difference is produced between the inside of the composite material and a sucking side thereof.

Moreover, as described above, the mixture is slowly cured about those ascending parts, and thus, the mixture thereabout still has a high fluidity.

As a result, as shown in FIG. 4(b), the liquid foamable mixture in a flowing condition is attracted together with the surface material toward the sucking side, and a reactive force produced by the pressing and compression acts on the mixture so as to push the surface material 2 on the lower surface 31 of the pressure applying die 30, so that the surface material can be conformed along the molding surface of the pressure applying die 30.

Meanwhile, the curing of the mixture in the central part progresses, so that the mixture in the central part is in a condition difficult to crush.

Therefore, even though the first foamed body 10 with the low air-permeable impregnated layer is sucked by the pressure applying die so as to lift toward the mixture 15, the first foamed body 10 is not lifted as happened in the art because the central part of the mixture 15 (that is, a thick part of the layered mixture) is difficult to crush even though a pressure is applied thereto (with reference to FIG. 7). Thus, a first foamed body having a worse tactile feeling of a seat surface made by crushing the mixture 15 by lifting the first foamed body by the suction is not formed.

Furthermore, such a thick part of the layered mixture is cured, and as are result, a circumference of the sucked and molded portion is supported against the suction, so that the mixture is effectively attracted by the suction.

As described above, a partial curing speed of the foamable mixture 15 for forming the second foamed body depends on the composition and prescription of the mixture and the thickness of the layered mixture, and the composition and prescription of the mixture 15, a height of the ascending part of the first foamed body and a sucking strength by the pressure applying die are suitably determined in the manufacturing method described above. For example, when strongly sucked by the pressure applying die, a composition and prescription of the mixture 15 can be determined so as to make the curing speed thereof fast. When it can not be designed to make the ascending part high (that is, the first foamed body is hard and if the ascending part is designed so as to make it high, it makes a person who sits on a seat uncomfortable), a composition and prescription of the mixture 15 is so as to make the curing speed thereof slow. In addition, the sucking force of the pressure applying die can be controlled in accordance with the combination and prescription of the foamable mixture for forming the desired second foamed body.

The liquid foamable mixture 15 is not separated from the first foamed body 10 during the suction. This is because when introducing and layering the liquid foamable mixture 15 on the first foamable mixture, a part thereof is impregnated in the first foamed body through the surface thereof, so that the impregnated layer is formed. Note that it is feared that the liquid foamable mixture may be percolated to the surface material during the suction (because the surface material is air-permeable), however, such a percolation does not happen by sucking and compressing after elapsing a predetermined duration (after clapse of about 50 seconds, when using the liquid foamable mixture described hereinabove and molding a common seat as shown in the figures) after introducing and layering the liquid foamable mixture 15. Also, protection from percolation of the mixture to the surface material may be effected by attaching a plate material of a slab urethane foam on the back surface of the surface material.

Then, when the liquid foamable mixture 15 is changed into a solid condition, the second foamed body 6 having a desired resiliency and a desired shape is formed and simultaneously the second foamed body 6 is connected in one with the surface material through the back surface thereof on the upper side of the second foamed body 6 and is connected in one with the first foamed body 10 on the lower side of the second foamed body 6. Thereby, the seat according to the present invention is completely manufactured.

In the manufacturing method described above, when the liquid foamable mixture is layered on the slope portions of the first foamed body 10 in the same thickness, the compressibility thereof is higher than that of the main part, so that the hardness of a portion corresponding to each slope portion is higher and that of a portion corresponding to the main part is constant and soft.

In this embodiment, a manufacturing method of a seat having descending parts formed thereon has been described, and a seat in which a desired shape such as a curved shape or a three dimensional shape other than the descending parts is formed can be manufactured by this method.

In this embodiment, in order to thin the layered liquid foamable mixture at the sucked and molded portion and thicken the layered mixture at a portion to be sucked and compressed, the ascending part is formed on a part of the first foamed body corresponding to the sucked and molded portion and the mixture is layered on this foamed body in level.

However, without providing such a ascending part on the first foamable mixture, a thickness of the liquid foamable mixture can be changed on a flat first foamed body such that the mixture is introduced and layered thinly on a part of this foamed body corresponding to the sucked and molded portion and thickly on a part thereof to be compressed.

As described above, in the art, when the mixture introduced and layered on the first foamed body is compressed by the pressure applying die and is simultaneously sucked and molded in order to form deep descending parts and complicated curved shapes on a seat, the first foamed body is lifted toward the mixture so as to crush the mixture, so that a seat having a desired shape and a desired tactile feeling of a seat surface can not be manufactured. In contrast, according to the present invention, a seat which has a shape corresponding to the pressure applying die and is covered with a surface material connected in one with the foamed body can be manufactured.

Figure 8:
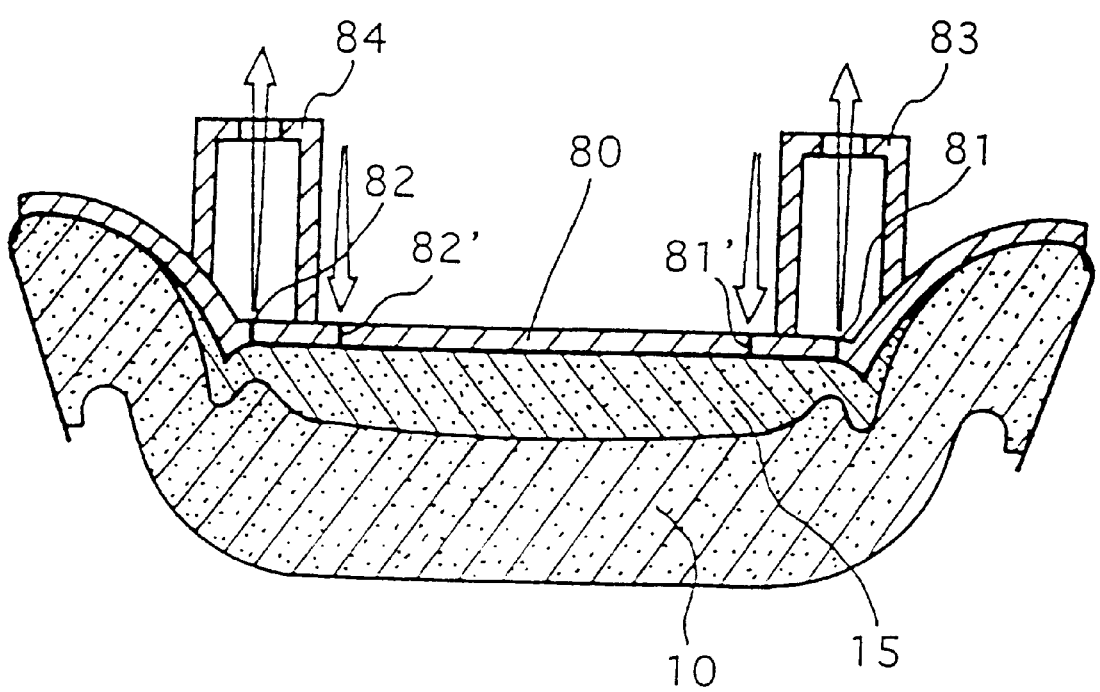
FIG. 8 is a cross sectional view of an arrangement when a seat according to the present invention is manufactured by use of another pressure applying die.

FIG. 8 is a cross sectional view of an arrangement when a seat of another embodiment of the present invention is manufactured.

As shown in this figure, a pressure applying die 80 used in this embodiment has suction holes 81, 82 provided at positions corresponding to each sucked and molded portion, and decompression chambers 83, 84 are provided behind those suction holes 81, 82, respectively. A suction is carried out through the suction holes 81, 82 by decompressing each decompression chamber. In addition, air-event holes 81', 82' are provided in line adjacent to the suction holes 81, 82, respectively. Those air-vent holes 81', 82' serve to carry out an air-ventilation between an inside of the pressure applying die and an outside thereof.

The number and shapes of the suction holes 81, 82 can be determined as described in relation to the pressure applying die of FIG. 4.

As described in relation to FIG. 4, the liquid foamable mixture 15 is introduced and layered on the first foamed body 10 and the pressure applying die 80 is moved downward from a position above the surface material 2 which covers the layered mixture 15. Simultaneously, the decompression chambers 83, 84 are decompressed and the suction is carried out through the suction holes 81, 82.

A pressure difference is produced by contacting the pressure applying die 80 to the mixture 15, so that the liquid foamable mixture 15 is attracted toward the pressure applying die 80 together with the surface material 2 and simultaneously air around the first foamed body 10 serves to lift the first foamed body 10 in accordance with the pressure difference. Thus, air flows through the air-vent holes 81', 82' from the inside (an upper side in this figure) of the pressure applying die 80 to the outside thereof (a lower side in this figure) so as to diminish this pressure difference. This air flow causes to vanish the pressure difference which serves so as to lift the first foamed body 10.

Moreover, since the mixture 15 is thickly layered on the central part, the resinification or curing of the mixture on the central part is accelerated, so that the mixture 15 is not crushed even though a force is acted to the first foamed body 10 so as to lift the first foamed body 10.

As described above, while the liquid foamable mixture is sucked and molded, the mixture is not crushed by lifting the first foamed body 10.

A detailed embodiment using the pressure applying die of FIG. 8 is as follows.

Each suction hole 81, 82 is 2 mm in diameter and is formed in line with 10 mm intervals. The vacuum chamber is connected to a vacuum pump (not shown).

Each air-vent hole 81', 82' is 1 mm in diameter and is formed in two lines with 10 mm intervals.

The liquid foamable mixture shown in Table 1 for forming the second foamed body is introduced and layered on the first foamed body 10 by a spray system (PSM-3000™, No.3 head, ISOTHERM Co.) such that a thickness of the layered mixture is 5 mm on the ascending parts and 20 mm on the central part. After elapsing 20 seconds thereafter, the layered mixture is covered with the surface material. After 50 seconds, the mixture 15 is pressed and compressed between the pressure applying die 80 and the first foamed body 10, and simultaneously the decompression chambers 83, 84 of the pressure applying die 80 are decompressed.

By a manner described above, the surface material is connected in one with the second foamed body, the second foamed body is connected in one with the first foamed body, and the second foamed body is not crushed. Thereby, an air-permeable seat which has a shape corresponding to a molding surface of the pressure applying die and has a tactile feeling of the seat surface is manufactured.

In a seat according to the present invention, the foamed body is covered with the air-permeable surface material, and thus, the seat is air-permeable and has a tactile feeling of the seat surface.

Moreover, the liquid foamable mixture is pressed and compressed by use of the pressure applying die and is simultaneously sucked through the suction holes, so that the mixture is not excessively crushed and the surface material is pushed on the molding surface of the pressure applying die to mold the second foamed body, and thus, the seat can have a desired surface shape corresponding to the molding surface of the pressure applying die.

Other than those effects, since the surface material is connected in one with the second foamed body and the second foamed body is connected in one with the first foamed body, it makes a person who sits on the seat more comfortable by a soft, resilient foamed body. When a person sits on the seat, the surface material is stretched by a weight of the person, and then, when the weight is released, the surface material is recovered to its original shape by the resiliency of the foamed body so as not to form wrinkles thereon.

Furthermore, when the slope portion of the seat is harder than the main portion of the seat, a shape of the seat can be held and it does not make a person who sits on the seat uncomfortable.

In addition, the foamed body composed of two foamed body, one being underlain by another, and when the lower side of the foamed body is harder than the upper side thereof, it does not make the person uncomfortable, the weight thereof can be supported, and simultaneously the shape of the seat can be held.

The surface material which contacts to the person can be molded by one surface material, and thereby it is not necessary to cut several components of the surface material, and thus, constituent parts and materials are simplified and the manufacture is also simplified, and as a result, the total manufacturing cost is reduced.

Each foamed body is in one with each other, so that any work for assembling those foamed bodies is unnecessary and is eliminated.

What is claimed is:

1. A method for manufacturing a seat comprising the steps of:
   providing a foamed body forming an external shape of said seat and having as a base a first foamed body;
   introducing and layering a liquid foamable mixture for forming a second foamed body on said first foamed body, said layering forming a central portion not to be substantially compressed and an adjacent thinner portion;
   placing an air-permeable surface material on said layered liquid foamable mixture; and
   positioning a pressure applying die on said surface material to press and compress said layered liquid foamable mixture on said first foamed body, said pressure applying die having a molding surface and at least one suction hole overlying said thinner portion of said liquid foamable mixture, and the die acting to suck said layered liquid foamable mixture proximate said suction hole when said layered liquid foamable mixture has completed a gas reaction but is still in a visco-elastic condition,
   wherein said suction hole of said pressure applying die is at least provided at a position corresponding to a sucked and molded portion of said second foamed body.

2. The method of claim 1, wherein at least one ascending part is formed on a part of said first foamed body adjacent said thinner portion of said liquid foamable mixture.

3. The method of claim 1 or 2, wherein an air-ventilation between an inside of said pressure applying die and an outside thereof is carried out through vent holes in said pressure applying die.

4. The method of claim 1 or 2, wherein said step of introducing and layering said liquid foamable mixture is carried out before said step of placing an air-permeable surface material.

5. The method of claim 1 or 2, wherein said step of placing said surface material is carried out so as to cover said layered liquid foamable mixture with an upper part of said surface material and to cover a portion of said first foamed body with side parts of said surface material.

6. The method of claim 1 or 2, wherein said surface material comprises an upper part which is air-permeable and side parts continued therefrom, said upper part being impregnated with said second foamed body and said side parts covering side surfaces of said first foamed body.

7. The method of claim 1 or 2, wherein the hardness of said first foamed body is different from the hardness of said second foamed body.

8. The method of claim 1 or 2, wherein said first foamed body and said second foamed body are made of a polyurethane foam.

9. The method of claim 1 or 2, wherein said surface material is an air-permeable woven fabric or knitted fabric fiber material.

10. The method of claim 1 or 2, wherein a plate material of slab urethane foam is provided on the back surface of said surface material to engage said liquid foamable material.

11. The method of claim 1 or 2, wherein said first foamed body and said second foamed body are made of a polyurea foam.

12. A seat constructed of foam and covered by surface material, the seat comprising a first foamed body constituting a base and having an upper surface with a flat central part, with ascending parts on both sides of said flat central part, and with rising side surfaces outwardly of said ascending parts, a second foamed body overlying and impregnated into said first foamed body, said second foamed body having a main part of generally uniform thickness attached to said flat central part of said first foamed body, having a part attached to said ascending parts of said first foamed body that is relatively thin in relation to said main part and having slope portions attached to said side surfaces of said first foamed body becoming gradually thinner, and said surface material covering and attached to at least said second foamed body.

13. A seat according to claim 12, wherein said first foamed body is harder than said second foamed body.

14. A seat according to claim 12, wherein said slope portions of said second foamed body are harder than said main part of said second foamed body.

15. A seat according to claim 12, wherein said surface material has an upper part which is air-permeable and side parts continued from said upper part, said upper part being attached to said second foamed body and said side parts covering said side surfaces of said first foamed body.

16. The seat of claim 12, wherein said surface material is an air-permeable woven fabric or knitted fabric fiber material.

17. The seat of claim 12, wherein a plate material of a slab urethane foam is provided on said back surface of said surface material.

18. The seat of claim 12, wherein the hardness of said first foamed body is different from the hardness of said second foamed body.

* * * * *